United States Patent [19]

Hamsley

[11] 4,001,963

[45] Jan. 11, 1977

[54] FISH DART

[76] Inventor: Minton W. Hamsley, 127 Centre Ave., East Rockaway, N.Y. 11518

[22] Filed: Nov. 6, 1975

[21] Appl. No.: 629,383

[52] U.S. Cl. .................................. 43/6; 294/61
[51] Int. Cl.² .................................. A01K 81/04
[58] Field of Search ........................... 43/6; 294/61

[56] References Cited

UNITED STATES PATENTS

| | | | |
|---|---|---|---|
| 2,448,864 | 9/1948 | Crandall | 43/6 |
| 2,684,851 | 7/1954 | Stokes | 43/6 X |

*Primary Examiner*—Louis G. Mancene
*Assistant Examiner*—Daniel J. Leach
*Attorney, Agent, or Firm*—Daniel Jay Tick

[57] ABSTRACT

A fish dart comprising an oval shaped weighted body having an axis, a length extending along the axis and spaced opposite first and second ends on its axis defining its length. A barbed member extends from the first end of the body coaxially with the body. An eye member extends from the second end of the body coaxially with the body for affixing a fishing line to the fish dart.

4 Claims, 3 Drawing Figures

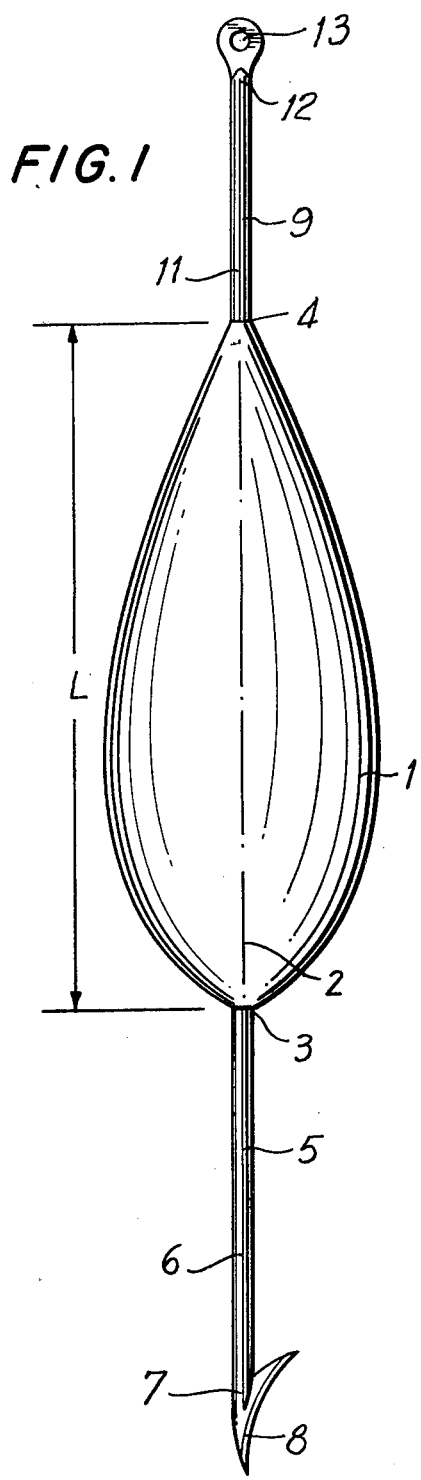
FIG.1
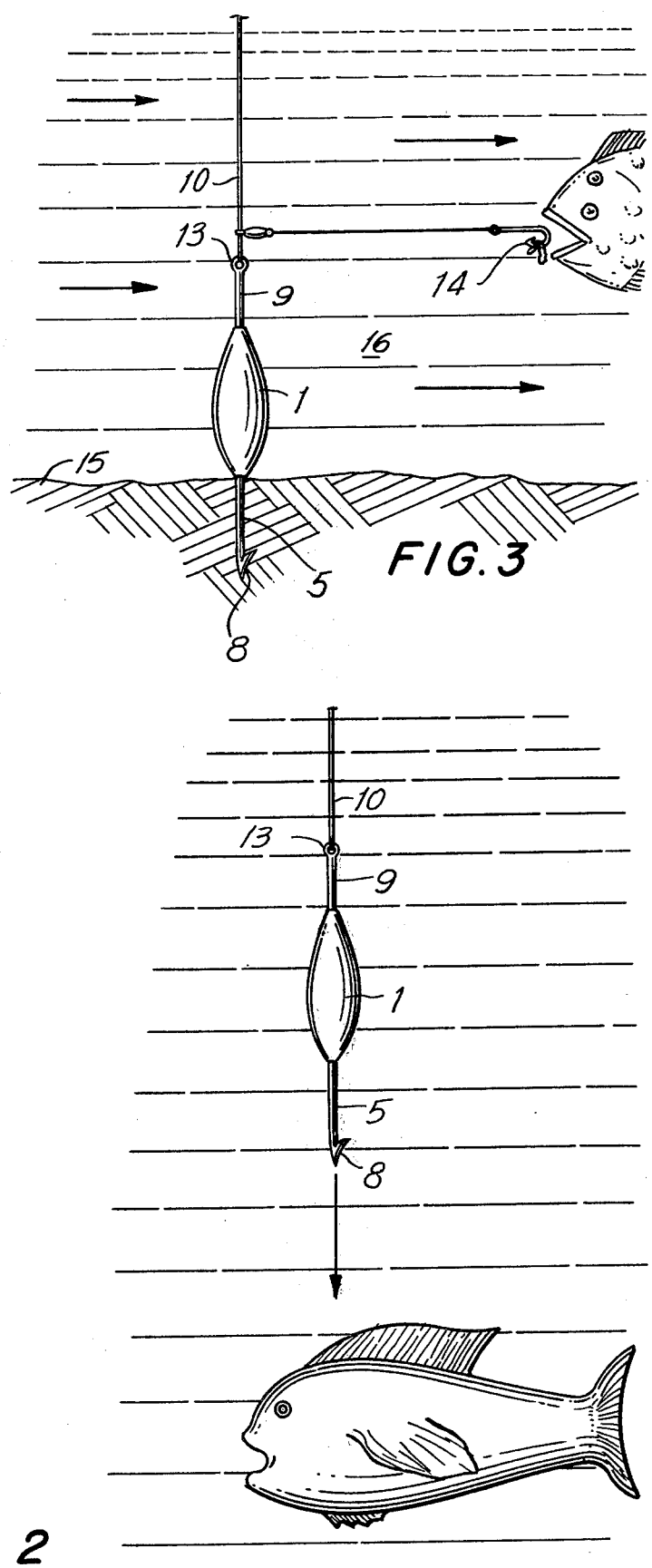
FIG.3
FIG.2

FISH DART

BACKGROUND OF THE INVENTION

The present invention relates to a fishing dart.

Fish often run in schools near the bottom of a body of water and may essentially blanket an area of the bottom under such circumstances. A properly equipped fisherman may gather many fish under such conditions, without bait, merely by spearing them, since any object dropped among the masses of fish is bound to impale at least one fish each time the object is dropped.

The principal object of the invention is to provide a fish dart for catching fish without bait.

An object of the invention is to provide a fish dart of simple structure, which is inexpensive in manufacture and used with facility and convenience to spear fish.

Another object of the invention is to provide a fish dart which functions efficiently, effectively and reliably to spear fish and haul them out of the water.

BRIEF SUMMARY OF THE INVENTION

In accordance with the invention, a fish dart comprises a substantially oval shaped weighted body having an axis, a length extending along the axis and spaced opposite first and second ends on its axis defining its length. A barbed member extends from the first end of the body coaxially with the body. An eye member extends from the second end of the body coaxially with the body for affixing a fishing line to the fish dart.

The weighted body is of substantially tear drop configuration and the first end thereof is generally more rounded than the second end. The second end is more narrow and stem-like than the first end.

The barbed member comprises a substantially rod-like member having a free end spaced from the body with a barb at the free end.

The eye member comprises a substantially rod-like member having a free end spaced from the body with an eye formed therein at the free end.

BRIEF DESCRIPTION OF THE DRAWINGS

In order that the invention may be readily carried into effect, it will now be described with reference to the accompanying drawings, wherein:

FIG. 1 is a view of an embodiment of the fish dart of the invention;

FIG. 2 is a view, on a reduced scale, of the fish dart of the invention in use, about to spear a fish; and FIG. 3 is a view, on a reduced scale, of the fish dart of the invention in use as an anchor for a fish hook.

In the FIGS., the same components are identified by the same reference numerals.

DETAILED DESCRIPTION OF THE INVENTION

The fish dart of the invention comprises a substantially oval shaped weighted body 1 (FIGS. 1 to 3) having an axis 2 (FIG. 1). The body 1 has a length L extending along the axis 2 (FIG. 1) and spaced opposite first and second ends 3 and 4, respectively, on its axis, defining its length.

The weighted body 1 is of substantially tear drop configuration and preferably comprises lead. The first end 3 of the body 1 is generally more rounded than the second end 4. The second end 4 of the body 1 is more narrow and stem-like than the first end 3.

A barbed member 5 extends from the first end 3 of the body 1 coaxially with said body (FIGS. 1 to 3). The barbed member 5 comprises a substantially rod-like member or steel rod 6 having a free end 7 spaced from the body 1 (FIG. 1) with a barb 8 at the free end (FIGS. 1 to 3).

An eye member 9 extends from the second end 4 of the body 1 coaxially with said body (FIGS. 1 to 3) for affixing a fishing line 10 to the fish dart (FIGS. 2 and 3). The eye member 9 comprises a substantially rod-like member or steel rod 11 having a free end 12 spaced from the body 1 (FIG. 1) with an eye 13 formed therein at the free end (FIGS. 1 to 3).

The fish dart of the invention preferably comprises a single steel rod of approximately ⅛ inch diameter, approximately 7 inches long with the body 1 comprising a lead mass affixed to said rod. The overall weight of the fish dart is approximately 6 ounces, but may, of course, be heavier, as required.

The fish dart of the invention may be used as an anchor for a fish hook or a plurality of fish hooks, as shown in FIG. 3. In FIG. 3, a fish hook 14 is affixed to the fishing line 10 near the bottom 15 of a body of water 16.

While the invention has been described by means of a specific example and in a specific embodiment, I do not wish to be limited thereto, for obvious modifications will occur to those skilled in the art without departing from the spirit and scope of the invention.

I claim:

1. A fish dart, comprising
   a substantially oval shaped weighted body having an axis, a length extending along the axis and spaced opposite first and second ends on its axis defining its length;
   a barbed member extending from the first end of the body coaxially with said body; and
   an eye member extending from the second end of the body coaxially with said body for affixing a fishing line to said fish dart, said barbed member and said eye member being integrally formed with said body and each of said barbed member, said eye member and said body being stationary relative to the others.

2. A fish dart as claimed in claim 1, wherein said weighted body is of substantially tear drop configuration and the first end thereof is generally more rounded than the second end, said second end being more narrow and stem-like than said first end.

3. A fish dart as claimed in claim 2, wherein said barbed member comprises a substantially rod-like member having a free end spaced from the body with a barb at the free end.

4. A fish dart as claimed in claim 3, wherein said eye member comprises a substantially rod-like member having a free end spaced from the body with an eye formed therein at the free end.

* * * * *